Figure 5:
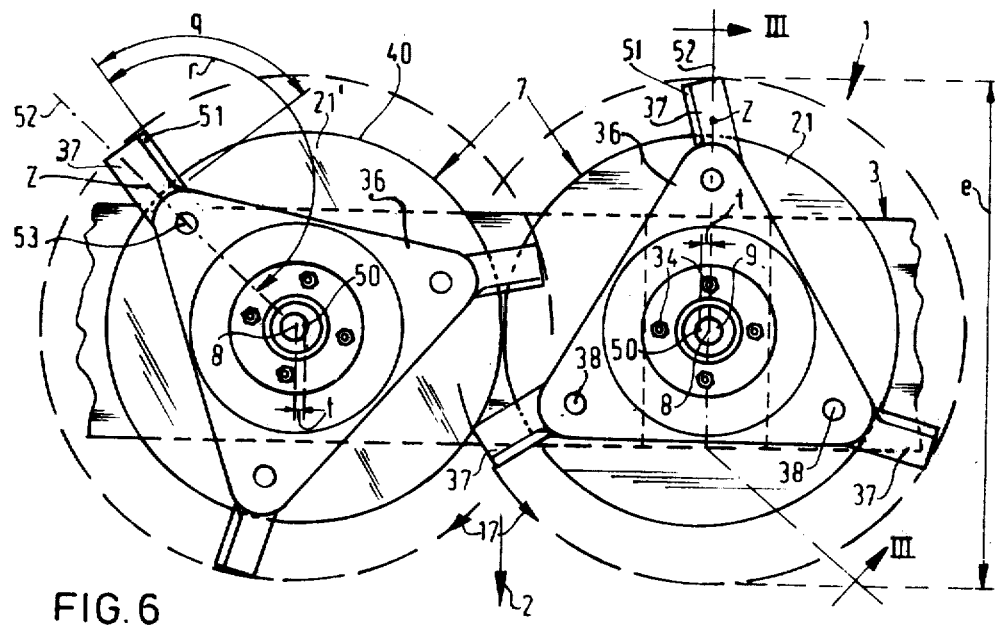

United States Patent [19]

Oosterling et al.

[11] 4,183,196
[45] Jan. 15, 1980

[54] MOWING DEVICE

[75] Inventors: Pieter A. Oosterling; Hendricus C. van Staveren, both of Nieuw-Vennep, Netherlands

[73] Assignee: Vicon N.V., Nieuw-Vennep, Netherlands

[21] Appl. No.: 868,884

[22] Filed: Jan. 12, 1978

[30] Foreign Application Priority Data

Jan. 19, 1977 [NL] Netherlands ............ 7700540
May 25, 1977 [NL] Netherlands ............ 7705784

[51] Int. Cl.² .......................................... A01D 55/18
[52] U.S. Cl. .......................................... 56/295; 56/6; 56/13.6
[58] Field of Search ............... 56/295, 6, 13.6, 13.7, 56/17.4, 17.5, 255

[56] References Cited

U.S. PATENT DOCUMENTS

| | | | |
|---|---|---|---|
| 1,291,295 | 1/1919 | Wagner et al. | 56/255 |
| 3,247,657 | 4/1966 | Scarnato et al. | 56/295 |
| 3,513,648 | 5/1967 | Kline et al. | 56/13.6 |
| 3,524,306 | 8/1970 | Reber | 56/12.3 |
| 3,905,182 | 9/1975 | Geier | 56/13.6 |
| 3,916,725 | 11/1975 | Reber | 56/295X |

FOREIGN PATENT DOCUMENTS 104951 5/1924 Switzerland ............... 56/255

Primary Examiner—Russell R. Kinsey
Attorney, Agent, or Firm—John P. Snyder

[57] ABSTRACT

A mowing device includes at least a pair of cooperative rotary cutting mechanisms. Each cutting mechanism comprises a driven carrier and at least one cutter pivotally connected thereto and projecting radially therefrom. Mounted below each carrier is a cutting plate having a cutting edge above which the associated cutter sweeps. The cutting edge of the cutter normally lies along a line which defines an acute angle with at least portions of the cutting edge of the cutting plate so as to effect a scissors action therewith, and which line also is angularly offset by more than 90° with respect to a line passing through the center of gravity of the cutter and the axis of rotation of the carrier.

8 Claims, 8 Drawing Figures

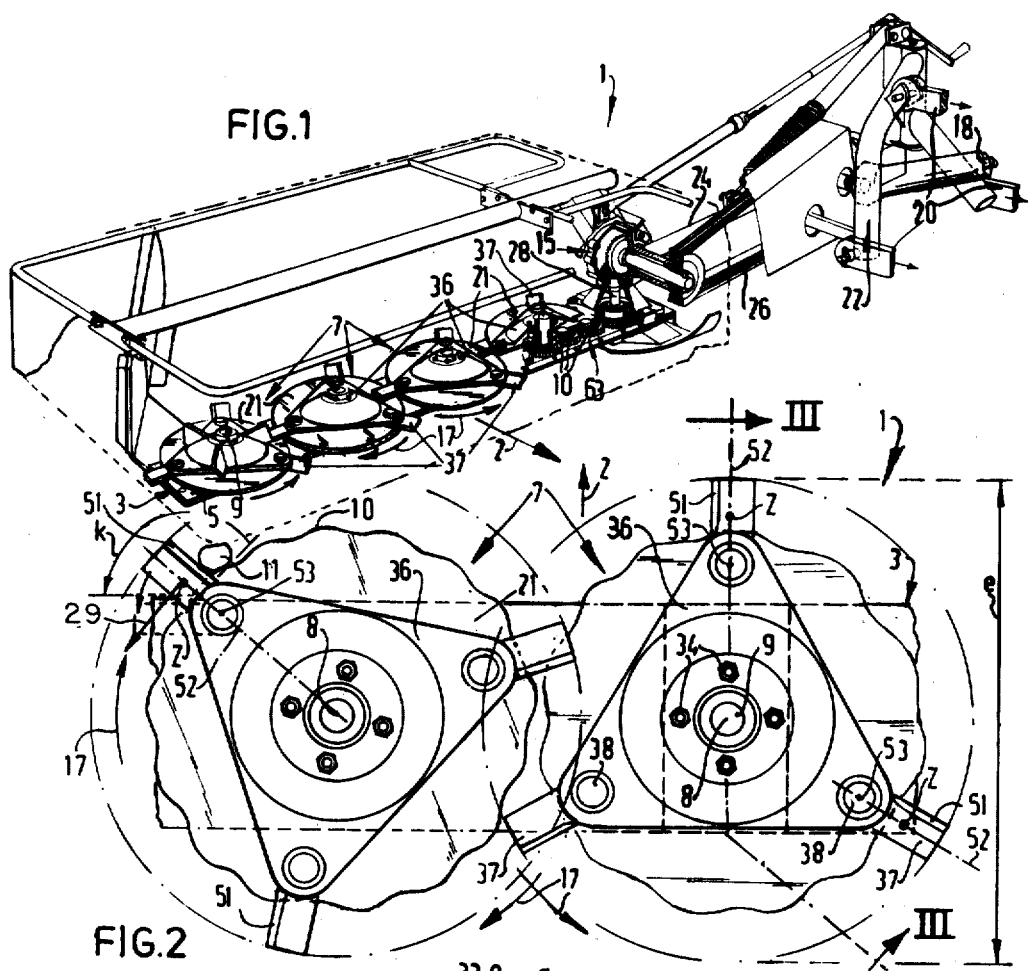
FIG.1
FIG.2
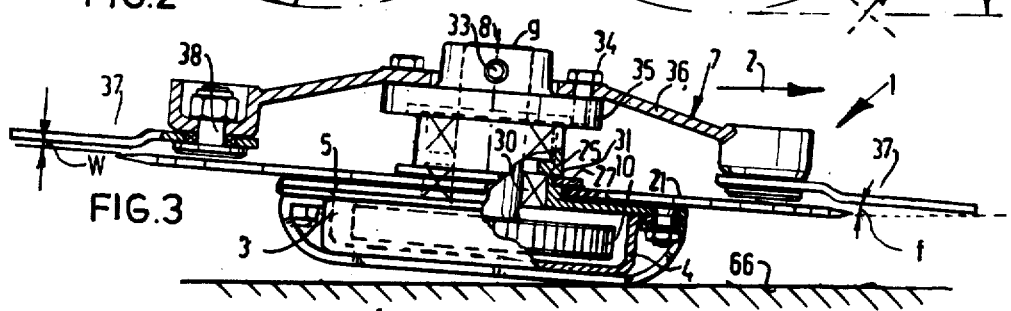
FIG.3
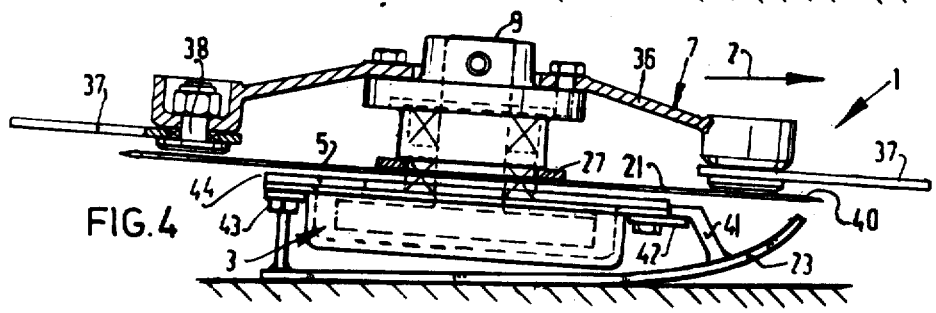
FIG.4

MOWING DEVICE

The invention relates to a mowing device comprising a housing extending transversely of the direction of movement of the mowing device, a plurality of cutting members rotatably journalled on said housing and a driving gear arranged in said housing for driving the cutting members, in which each cutting member comprises at least one cutter carrier rotatable above the housing and at least one cutter fastened to the periphery of the cutter carrier co-operating with a subjacent, non-driven counter-cutter carried by the housing.

Such a mowing device is known from French Pat. No. 683,434 of Solness. The cutter has the shape of a sickle and the crop is essentially cut by the cutters being drawn like sickles through the stalks. The rotating crescent-shaped cutters cutting like scissor legs co-operate with non-rotating counter-cutters forming the other scissor legs. Stones may be jammed between the crescent-shaped cutters and the counter-cutters, that is to say in the pair of scissors, which may give rise to serious damage of the mowing device, particularly of its driving gear. The counter-cutter is formed by a front edge of the housing. This front edge is an integral part of the housing. Due to wear of the counter-cutter this known mowing device gets worn out after a short time to an extent such that the co-operation between the cutter and the counter-cutter strongly diminishes irreparably.

The invention has for its object to provide a simple mowing device in which the scissor-like co-operation between the cutter and the counter-cutter is maintained for a long time and the risk of damage by jammed stones is reduced.

According to the invention the mowing device of the kind set forth is improved in that the cutting edge of the cutter is at an angle of more than 90° to the line going through the centre of gravity and the fastening point of the cutter or extends parallel to said line.

When a stone gets in between the cutter and the counter-cutter, that is to say, in the pair of scissors, the cutter first deflects substantially in a tangential direction opposite the direction of rotation of the mowing member concerned and according as the cutting angle between the cutter and the counter-cutter becomes more obtuse the cutter deflects towards the axis of rotation of the mowing member as far as beyond the reach of the counter-cutter. During this return deflection the pair of scissors opens until the scissor legs are at least at an angle of about 180°. This backward deflection is possible because in the mowing device according to the invention the cutter is held in the cutting position by centrifugal force rather than by a pulling sickle force, which centrifugal force can be overcome by a stone. After the passage of the stone, the cutter moves back under the action of said centrifugal force into the working position to form the operative pair of scissors.

Each counter-cutter is preferably formed by a ring, which is adapted to turn about an upright bearing collar of the housing. As a result of the cutting operation the ring will turn slightly, particularly so when alien objects collide herewith. The ring thus remains clean and wear is distributed over the whole periphery. This means an appreciable longevity of the ring.

If the ring should exhibit at one place, for example, at the front irregular and uneven wear, the user can turn a part of lesser wear to the front.

The shape and the fastening mode of the ring are extremely simple, particularly when the ring is locked in place by means of a resilient guard ring engaging an external groove of the bearing collar. When after a long time the ring has worn off too much, it can be readily replaced by a new one.

If at least one supporting skid extending beneath the housing and at the front upwardly into the proximity of the cutting edge of the ring is provided, the ring is protected on the bottom side by said supporting skid, so that a ring of sheet material may be used. The shearing effect between the cutter and the counter-cutter is further improved when the counter-cutter is arranged eccentrically to the rotary axis of the associated mowing member and/or when the cutting edge of the counter-cutter has a corrugated or serrated shape.

A clean shearing effect requires only little energy if the legs are sharp. In practice the shear legs are found to be blunt after a short time to an extent such that the advantage of the low amount of energy required for cutting gets lost or is substantially annulled by the higher amount of frictional resistance between the relatively movable shear legs with the crop fibres and other substances such as sand penetrating in between. However, in order to ensure the advantages of a shearing effect without the disadvantages thereof, the cutting edge of the counter-cutter is located preferably at a considerably lower level than the path of the cutting edge of the cutter. In this case a complete shear effect is not obtained, because the shear legs do not skim one another, but the crop stalks cut by the stroke of the cutter are supported at a higher level than the ground so that they can deflect only to a lesser extent. This improves the mowing effect. On the other hand the frictional resistance between the cutter and the counter-cutter is slight. It should be noted that crop or dirt cannot stick to the counter-cutters because the cutters extend further than the counter-cutters so that any stalk or the like adhering to a counter-cutter will be immediately wiped off.

In order to adapt the shear effect between the cutter and the counter-cutter to the conditions of the crop to be mown, the level of the counter-cutter is preferably adjustable.

By way of example the invention will be described more fully hereinafter with reference to preferred embodiments of a mowing device according to the invention.

Figure 6:
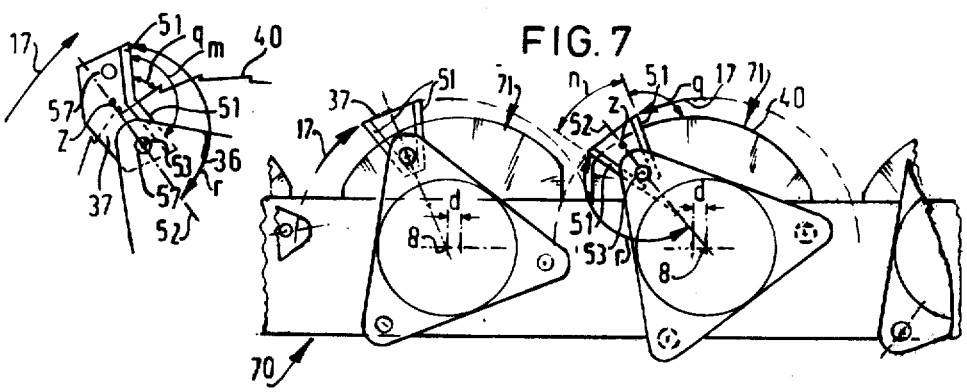
Figure 7:
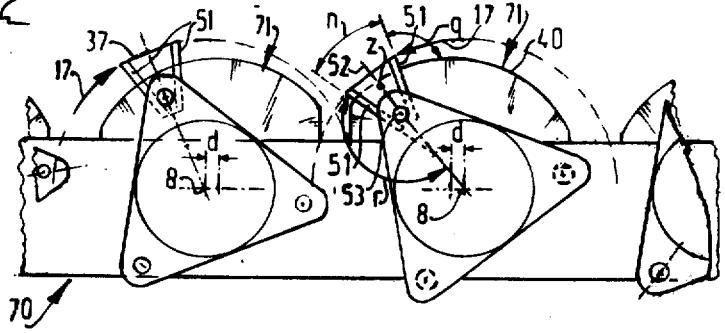
Figure 8:
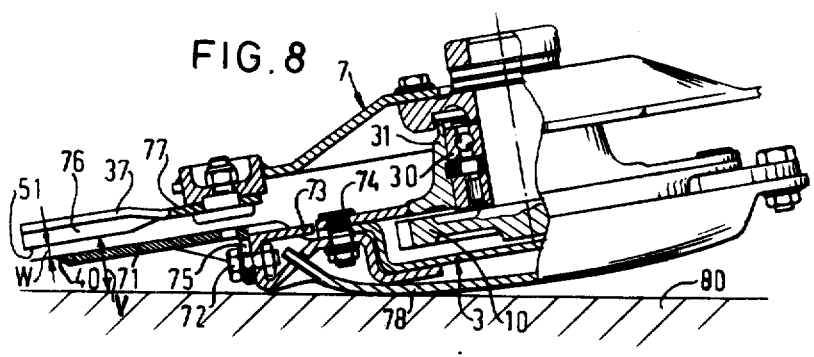

In the drawing:

FIG. 1 is a perspective elevational view partly broken away of a mowing device in accordance with the invention, FIG. 2 is a plan view partly broken away of said mowing device on an enlarged scale, FIG. 3 is a sectional view taken on the broken line III—III in FIG. 2, FIG. 4 is a sectional view like FIG. 3 of a different embodiment of a device in accordance with the invention, FIG. 5 is a plan view like FIG. 2 of a different mowing device in accordance with the invention, FIG. 6 shows on an enlarged scale a variant of detail VI of FIG. 5, FIG. 7 is a plan view of a detail of a further developed mowing device in accordance with the invention, and FIG. 8 is a sectional view taken on the line VIII—VIII in FIG. 7.

Referring to FIG. 1, the mowing device 1 is connected by means of an auxiliary frame 24 with a framework 22 connected to the suspension rods 20 of a tractor (not shown) and is driven through a bevel gear drive 15 and a belt drive 26 via a universal joint 18 by a power take-off shaft of the tractor.

The mowing device 1 embodying the invention comprises a housing 3 in the form of a flat, elongated beam extending transversely of the intended direction of movement 2 and consisting mainly of a trough 4 and a cover 5 secured to the latter. The housing 3 has a plurality of rotatable cutter members 7 adapted to rotate about upright axes 8. The cutter members 7 are arranged near and above the housing 3 and rotate pairwise in opposite senses 17. Each cutter member 7 is rigidly connected by means of a shaft 9 with a pinion 10 of a driving gear means 63 accommodated in the housing 3 and comprising a series of pinions 10 and being driven through a shaft 28 by the bevel gear drive 15.

FIG. 3 shows that the shaft 9 of each cutting member 7 is rotatably journalled in an upright bearing collar 31 of the cover 5 by means of a bearing 30. A hub 35 is connected by means of a transverse pin 33 with a shaft 9.

Each cutting member 7 comprises a preferably substantially triangular, disc-shaped cutter carrier 36 fastened to the hub 35 by means of screws 34 and at least one, but preferably three cutters 37 fastened to the periphery of the cutter carrier 36.

Beneath each cutter carrier 36 and above the housing 3 a rotatable ring 21, which is not driven, is arranged around the bearing collar 31 of the housing 3. When the hub 35 is removed, the ring 21 can be slipped onto the bearing collar 31 and retained by means of a resilient guard ring 27 in engagement with an external groove 25 of the bearing collar 31. The ring 21 constitutes a counter-cutter, whose outer edge which is milled and ground as illustrated in FIG. 2, has a kind of co-operative scissor effect with each rapidly moving cutter 37 located at a small distance above it. The ring 21 constitutes a retainer against which retaining the crop is held whilst it is cut by the rapidly rotating cutter 37. When a stone 11 gets in between a ring 21 and a cutter 37, the cutter 37 first deflects substantially in a tangential direction 29 opposite the direction of rotation 17 of the cutting member 7 concerned and according as the cutting angle k between the cutter 37 and the cutting edge 40 becomes appreciably more obtuse the cutter 37 deflects more towards the rotary axis 8 as far as beyond the cutting range of the ring 21. As a result the stone 11 cannot be jammed so that serious damage of the mowing device 1, particularly of the driving gear means 63 is avoided. During this deflection the cutter 37 skims past between the cutter carrier 36 and the ring 21 without touching them. The cutter 37 can deflect away under any condition because its cutting edge 51—viewed in the cutting direction of the cutter 37—is at the front at an angle r of more than 90° to the line 52 going through the centre of gravity Z and the fastening point 53 of the cutter 37 (see FIG. 5), which angle may be 180°, in which case the cutting edge 51 is parallel to said line 52 (see FIG. 1).

The cutters 37 of neighbouring cutting members 7 are relatively off-set through an angle of 60° so that they do not touch one another, though the cutter paths overlap one another. Each cutter 37 is freely rotatable about a pin 38.

In all embodiments shown the mowing device 1 has a low structure and the shape of the cutting members 7 is such that the mowing device 1 can readily pass below the cut crop. the circumferential speed of the cutters 37 is very high, for example, about 80 ms/sec. with an outer diameter e of 45 to 50 cms.

During the mowing operation the mowing device 1 is held in a slightly forwardly sloping position so that the cutting members 7 are at an angle f to the ground surface 66.

The ring 21 prevents stones and other objects from being jammed between the rotating cutting member 7 and the non-rotating housing 3. If objects get in between a cutting member 7 and the ring 21, the ring 21 can turn as required. The ring 21 may be made of thinner sheet material when it is protected on the bottom side against heavy upward bumps by a supporting skid 23 extending beneath the housing 3 and at the front upwardly to the proximity of the cutting edge 40 of the ring 21, said skid gripping by a front hook 41 around a tag 42 fastened to the housing 3 and being fastened by means of bolts 43 to the rear edge 44 of the housing 3.

The co-operative shear effect of the cutter 37 and the ring 21 is intensified according as the angle g between the cutting edge 40 of the ring 21 and the cutting edge 51 of the cutter 37 is more acute. For this purpose, as is shown in FIG. 5, the ring 21' is eccentrical to the axis 8 and rotatable about the axis 50, which is shifted over a small distance t towards the other cutting member 7 of the same pair rotating in the opposite sense away from the axis 8.

The cutting edge 51 is preferably at an acute angle r to the line 52 going through the centre of gravity Z and the fastening point 53 of the cutter 37 so that the cutting edge 51 is at an acute angle g of about 80° to the cutting edge of the ring 21. In a longitudinal sectional view the cutters 37 preferably exhibit a downwardly extending S-bend so that the cutting edge 51 of the cutters 37 cuts the crop with a small clearance w above the top face of the ring 21'. Owing to the acute angle g the cutting edge 40 of FIG. 5 can be circular as shown.

Referring to FIG. 6 the cutting edge 40 may be serrated, for example, in a sawtooth-like manner.

The cutter 37 of FIG. 6 has two cutting edges 51 and two fastening holes 57 so that after wear of one cutting edge 51 the cutter 37 can be inverted and be fastened to the cutter carrier 36 in a different hole 57. The cutting edges 51 are at an angle m of about 135° to one another. The cutting angle g between the cutting edges 51 and 40 is about 60°.

A highly preferred embodiment of the mowing device 70 according to the invention is shown in FIGS. 7 and 8. This mowing device 70 differs from the mowing device 1 in that the rings 21 are replaced by segment-shaped, curved counter-cutters 71 arranged at a distance d eccentrically to the axes 8 and being fastened by means of bolts 72 held in elongated holes 75 at adjustable levels to a mounting fillet 73, which is secured in turn by bolts 74 to the housing 3. According to the conditions of the crop to be mown the gap width w or the level difference between the cutting edges 40 and 51 can be set between 20 and 80% of the height v at which the cutting edge 51 of the cutter 37 moves above the ground 80 during the mowing operation. The bolts 72 can be passed through round, fitting holes, if adjustment of the gap width is not necessary. The cutter 37 is preferably torsioned between the handle 77 and the blade 76 and preferably has two cutting edges 51 being at an acute angle n of 45° so that each time an acute angle g between the cutting edges 51 and 40 is obtained.

A sliding plate 78 hooking into the mounting fillet 73 and bearing on the ground 80 is arranged beneath the housing 3. The sliding plate 78, like each segment-shaped counter-cutter 71 and each cutter 37, can be replaced by a new one after heavy wear.

What we claim is:

1. A mowing device comprising, in combination:

an elongate housing adapted to extend transversely of a line of mowing travel and having at least two drive shafts projecting upwardly therefrom;

gear means within said housing for rotating said drive shaft in relatively opposite direction;

a pair of carriers, one connected to each drive shaft, and at least one cutter associated with each carrier, each cutter having a cutting edge and means rotatably mounting each cutter to its associated carrier such that said cutting edge extends along a line which is angularly offset by greater than 90° from a line passing through the center of gravity of the cutter and the center of rotation of the associated carrier; and a pair of non-driven counter-cutters carried by said housing, one beneath each carrier, each counter-cutter having a cutting edge underlying the cutting edge of the associated cutter and which includes at least portions which define an acute angle with the cutting edge of the associated cutter when the latter sweeps thereover.

2. A mowing device as defined in claim 1 wherein the cutting edge of each counter-cutter is circularly arcuate and including means for mounting each counter-cutter such that such circular cutting edge is eccentric to the axis of rotation of the associated cutter.

3. A mowing device as defined in claim 2 wherein each counter-cutter is rotatably mounted on the housing concentric with the axis of rotation of its associated carrier.

4. A mowing device as defined in claim 2 wherein each counter-cutter is fixed to said housing.

5. A mowing device as defined in claim 4 including means for vertically adjusting each counter-cutter for varying the spacing between the cutting edge thereof and the cutting edge of its associated cutter.

6. A mowing device as defined in claim 1 wherein the cutting edge of each counter-cutter is serpentine.

7. A mowing device as defined in claim 1 wherein the cutting edge of each counter-cutter is serrated.

8. A mowing device as defined in claim 1 including at least one supporting skid attached to said housing and extending therebeneath, said skid having an upwardly curved front end terminating just below the cutting edge of a counter-cutter.

* * * * *